(12) United States Patent
Meierling (10) Patent No.: US 9,641,734 B2
(45) Date of Patent: May 2, 2017

(54) BARRIER FOR A LENS (71) Applicant: BlackBerry Limited, Waterloo (CA)

(72) Inventor: Klaus-Dieter Meierling, Bochum (DE)

(73) Assignee: BlackBerry Limited, Waterloo, Ontario (CA)

( * ) Notice: Subject to any disclaimer, the term of this patent is extended or adjusted under 35 U.S.C. 154(b) by 239 days.

(21) Appl. No.: 13/673,826

(22) Filed: Nov. 9, 2012

(65) Prior Publication Data

US 2014/0132818 A1 May 15, 2014

(51) Int. Cl.
*H04N 5/225* (2006.01)
*B29D 11/00* (2006.01)

(52) U.S. Cl.
CPC ....... *H04N 5/2256* (2013.01); *B29D 11/0073* (2013.01); *B29D 11/00432* (2013.01)

(58) Field of Classification Search
CPC .... H04N 5/2256; H04N 5/2254; G03B 15/05; G03B 2215/0503
USPC .......................................... 348/340, 373–376
See application file for complete search history.

(56) References Cited

U.S. PATENT DOCUMENTS

| | | | |
|---|---|---|---|
| 5,789,724 A * | 8/1998 | Lerssen et al. ............... | 219/741 |
| 7,662,094 B2 | 2/2010 | Iddan | |
| 8,363,157 B1 * | 1/2013 | Han .............................. | 348/371 |
| 2002/0153478 A1 | 10/2002 | Hsin | |
| 2003/0227547 A1 * | 12/2003 | Iddan ............................ | 348/151 |
| 2004/0051280 A1 * | 3/2004 | Anaya et al. ............... | 280/728.3 |
| 2005/0107118 A1 * | 5/2005 | Makino ....................... | 455/556.1 |
| 2005/0162543 A1 * | 7/2005 | Kobayashi .................... | 348/371 |
| 2005/0185090 A1 * | 8/2005 | Purdy et al. .................. | 348/376 |
| 2005/0229530 A1 * | 10/2005 | Schmidt ............ | B29C 45/14311 52/630 |
| 2006/0077649 A1 * | 4/2006 | Kumagai ........................ | 362/12 |
| 2007/0167834 A1 | 7/2007 | Pascal et al. | |
| 2009/0135286 A1 | 5/2009 | Takahashi | |
| 2009/0153729 A1 | 6/2009 | Hiltunen et al. | |
| 2010/0157141 A1 * | 6/2010 | Ouyang ........................ | 348/371 |
| 2010/0328219 A1 | 12/2010 | Lombardi et al. | |
| 2012/0018323 A1 * | 1/2012 | Johnson et al. .............. | 206/320 |
| 2012/0070140 A1 * | 3/2012 | Chow et al. .................. | 396/176 |
| 2012/0140107 A1 | 6/2012 | Anderson et al. | |
| 2012/0236425 A1 * | 9/2012 | O'Neill ........................ | 359/827 |
| 2013/0128104 A1 * | 5/2013 | Nunnink et al. .............. | 348/373 |
| 2013/0314582 A1 * | 11/2013 | Masser ......................... | 348/340 |
| 2014/0078382 A1 * | 3/2014 | Kudrna ......................... | 348/371 |

OTHER PUBLICATIONS

Extended European Search report mailed Apr. 16, 2013, in corresponding European patent application No. 12191912.0.

* cited by examiner

*Primary Examiner* — Christopher K Peterson
(74) *Attorney, Agent, or Firm* — Fish & Richardson P.C.

(57) ABSTRACT

Described is a lens for a camera, the camera having a flash and an image sensor, the lens comprising a flash portion for covering the flash; an image sensor portion for covering the image sensor; and a barrier between the image sensor portion and the flash portion.

15 Claims, 6 Drawing Sheets

BARRIER FOR A LENS

FIELD

The present disclosure relates to electronic devices having cameras and, more particularly, to electronic devices having cameras with lenses.

BACKGROUND

Electronic devices, such as smartphones and tablet computers, are sometimes equipped with cameras. Cameras may be used to allow a user to capture a video or a still photograph. Flashes are often used with cameras in order to illuminate a subject for capture by the cameras. Light emanating from such flashes can cause interference (or "crosstalk") with the camera's image sensor.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION

According to an aspect, described is a lens for a camera, the camera having a flash and an image sensor, the lens comprising a flash portion for covering the flash; an image sensor portion for covering the image sensor; and a barrier between the image sensor portion and the flash portion.

According to another aspect, described is an electronic device comprising an image sensor; a flash adjacent to the image sensor; a lens having an image sensor portion covering the image sensor and a flash portion covering the flash; a barrier attached to the lens between the image sensor portion and the flash portion for inhibiting the passage of light from the flash portion to the image sensor portion; and a housing for housing the image sensor and the flash.

According to another aspect, described is a method for making a lens for a camera, the lens having a barrier to inhibit light from passing between a flash portion of the lens and an image sensor portion of the lens, the method comprising heating plastic to melt the plastic; placing the plastic in a mold, the mold for shaping the plastic into a lens having a flash portion for covering a flash of a camera and an image sensor portion for covering an image sensor of the camera; inserting a barrier into the mold such that the barrier is positioned between the flash portion and the image sensor portion; and cooling the plastic.

Other example embodiments of the present disclosure will be apparent to those of ordinary skill in the art from a review of the following detailed descriptions in conjunction with the drawings.

Example Electronic Devices

Figure 1:
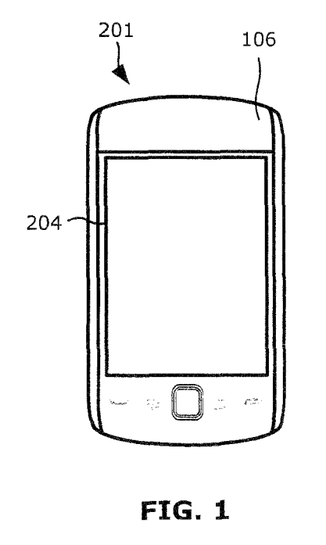
FIG. 1 is a front view of an example electronic device in accordance with example embodiments of the present disclosure.

Referring first to FIG. 1, a front view of an example electronic device 201 is illustrated. The electronic device 201 can be a mobile phone, portable computer, smartphone, tablet computer, personal digital assistant, a wearable computer such as a watch, a television, a digital camera or a computer system, for example. The electronic device 201 may be of a form apart from those specifically listed above.

FIG. 1 illustrates a front view of the electronic device 201. The front view of the electronic device 201 illustrates a front face 106 of the electronic device 201. The front face 106 of the electronic device 201 is a side of the electronic device 201 which includes a main display 204 of the electronic device 201. The front face 106 of the electronic device 201 is a side of the electronic device 201 which is configured to be viewed by a user.

Figure 2:
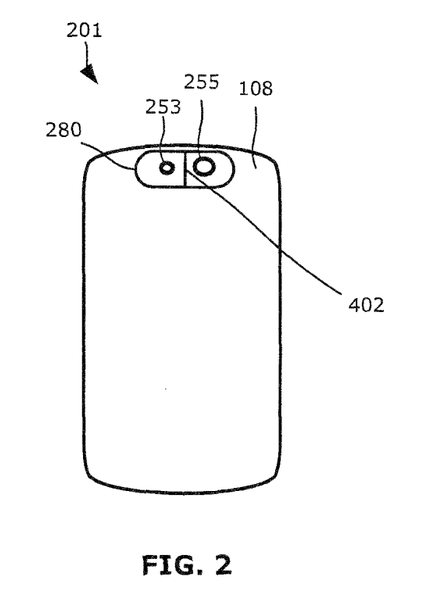
FIG. 2 is a rear view of the example electronic device of FIG. 1 in accordance with example embodiments of the present disclosure.

FIG. 2 illustrates a rear view of the electronic device 201. The rear view of the electronic device illustrates a rear face 108 of the electronic device 201. The rear face 108 is a side of the electronic device 201 which does not include a main display 204 of the electronic device 201. In the embodiment illustrated, the rear face 108 is a side of the electronic device 201 that faces the opposite direction compared to the front face 106 (FIG. 1) of the electronic device 201. That is, the rear face 108 may be substantially parallel to the front face 106 of the electronic device 201.

The electronic device 201 includes one or more cameras 253. The cameras 253 are configured to generate camera data, such as images in the form of still photographs and/or motion video. The camera data may be captured in the form of an electronic signal which is produced by an image sensor associated with the camera 253. Components other than the image sensor may be associated with the camera 253, although such other components are not shown in the Figures. More particularly, the image sensor (not shown) is configured to produce an electronic signal in dependence on received light. That is, the image sensor converts an optical image into an electronic signal, which may be output from the image sensor by way of one or more electrical connectors associated with the image sensor. The electronic signal represents electronic image data (which may also be referred to as camera data).

In the embodiment illustrated, the electronic device 201 includes a rear facing camera 253. A rear facing camera is a camera 253 which is located to obtain images of a subject near a rear face 108 of the electronic device 201. That is, the rear facing camera may be located on or near a rear face 108 of the electronic device 201.

In other embodiments (not illustrated), the electronic device 201 may include a front facing camera instead of or in addition to the rear facing camera. A front facing camera is a camera which is located to obtain images of a subject near the front face 106 (FIG. 1) of the electronic device 201. That is, the front facing camera may be generally located at or near a front face 106 of the electronic device 201. The front facing camera may be located anywhere on the front surface of the electronic device; for example, the front facing camera may be located above or below the display 204. In at least some example embodiments, the front facing camera may be provided in a central location relative to the display 204 to facilitate image acquisition of a face. In at least some embodiments, the front facing camera may be used, for example, to allow a user of the electronic device 201 to engage in a video-based chat with a user of another electronic device 201. In at least some embodiments, the front facing camera is mounted internally within a housing of the electronic device 201 beneath a region of the front face 106 which transmits light. For example, the front facing camera may be mounted beneath a clear portion of the housing (such as a transparent lens) which allows light to be transmitted to the internally mounted camera.

In at least some embodiments (not shown), the electronic device 201 may include a front facing camera and also a rear facing camera. The rear facing camera may obtain images which are not within the field of view of the front facing camera. The fields of view of the front facing and rear facing cameras may generally be in opposing directions.

The electronic device 201 includes a flash 255. The flash 255 may, in at least some embodiments, be a light emitting diode (LED) flash. The flash 255 emits electromagnetic radiation. More particularly, the flash 255 may be used to produce a brief bright light which may facilitate picture-taking in low light conditions. That is, the flash 255 may emit light while an image is captured using the camera 253. In the embodiment illustrated, the flash 255 is located to emit light at the rear face 108 of the electronic device 201. That is, the flash is a rear-facing flash in the illustrated embodiment. The electronic device 201 may include a front-facing flash instead of or in addition to the rear facing flash to emit light at the front face 106 of the electronic device 201. The electronic device 201 may have additional camera hardware which may complement the camera 253.

Still referring to FIG. 2, a lens 280 covers the image sensor of the camera 253 and the flash 255. The lens 280 allows light to pass though (e.g. from the flash 255 to the exterior of the housing or from the exterior of the housing to the image sensor) and prevents debris or dirt from entering into the housing. Dirt or debris that could otherwise enter into the housing could potentially damage the components of the camera 253 and flash 255. In the embodiment illustrated in FIG. 2 the lens 280 is secured to the housing. For example, the lens 280 may be secured to the housing an adhesive or using snaps or similar attachment mechanism in such a manner so as to be flush with the housing. The lens 280 can be transparent and made out of plastic or another suitable transparent or translucent material. In the illustrated embodiment, a barrier 402 is in the lens 280 between the flash 255 and camera 253. The lens 280 is described in more detail below.

Figure 3:
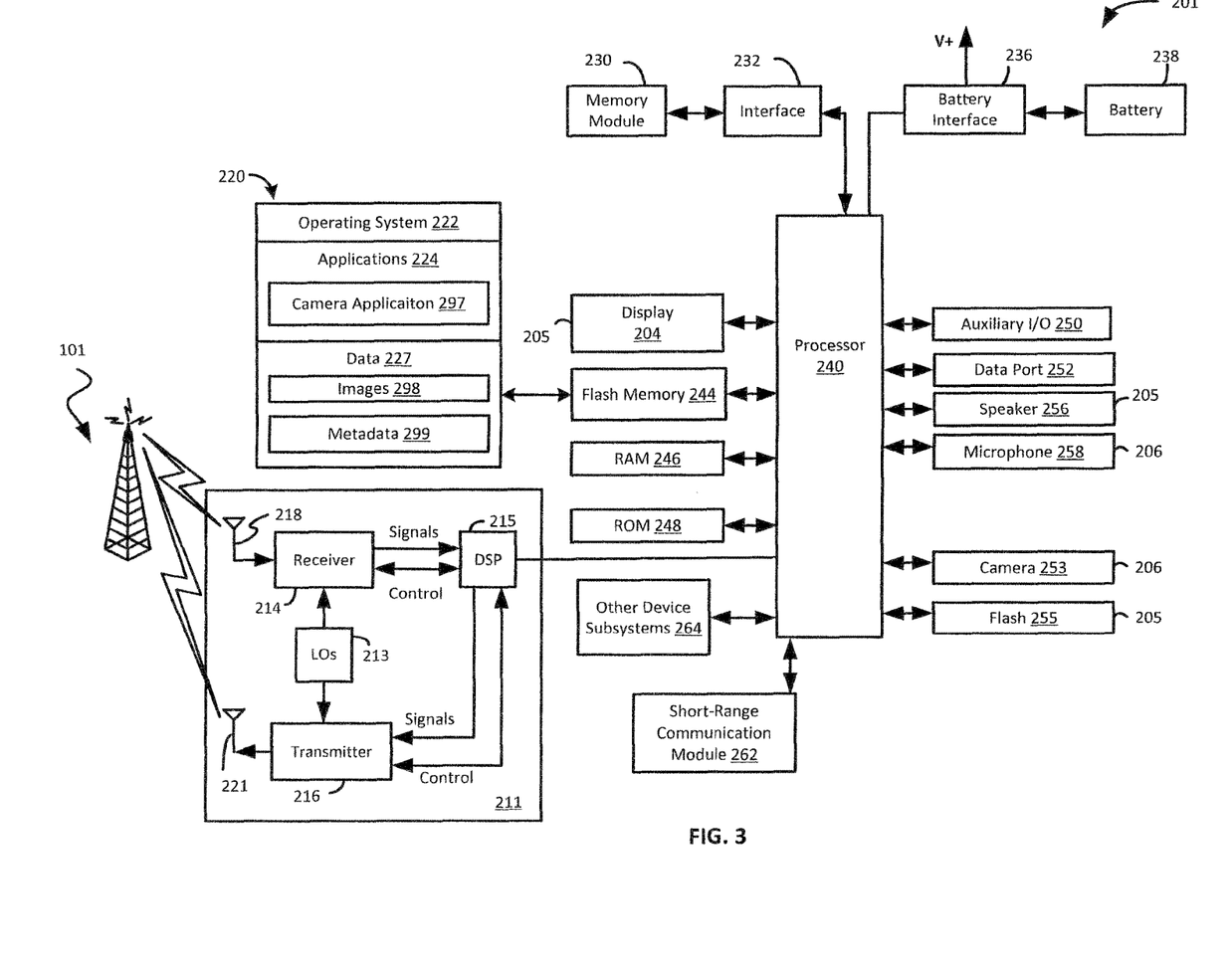
FIG. 3 is a block diagram illustrating components of the example electronic device of FIG. 1 in accordance with example embodiments of the present disclosure.

Referring now to FIG. 3, a block diagram of an example electronic device 201 is illustrated. The electronic device 201 of FIG. 3 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras 253, and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), a flash 255, one or more speakers 256, or other output interfaces), a short range communication module 262, and other device subsystems generally designated as 264. Some of the subsystems shown in FIG. 3 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images 298, and other commonly stored user information stored on the electronic device 201 by its user, and other data. The data 227 may, in at least some embodiments, include metadata 299 which may store information about the images 298. While the metadata 299 is illustrated separately from the images 298, in some embodiments, the metadata 299 and the images 298 may be stored together. That is, a single file may include both an image 298 and also metadata 299 regarding that image. For example, in at least some embodiments, the image may be formatted and stored as a JPEG image.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short range communication module 262 provides for communication between the electronic device 201 and different systems or devices, which need not necessarily be similar devices. For example, the short range communication module 262 may include an infrared device and associated circuits and components, or a wireless bus protocol compliant communication mechanism such as a Bluetooth® communication module to provide for communication with similarly-enabled systems and devices.

In the embodiment illustrated, the camera 253 is illustrated as being coupled directly with a main processor 240 which controls the camera. In at least some embodiments, the camera 253 may include a dedicated image signal processor which may provide at least some camera-related functions. For example, in at least some embodiments, the image signal processor of the camera 253 may be configured to provide auto-focusing functions. Functions or features which are described below with reference to the camera application 297 may, in at least some embodiments, be provided, in whole or in part, by the image signal processor.

The electronic device 201 also includes a flash 255. As noted above, the flash 255 is used to illuminate a subject while the camera 253 captures an image of the subject. The flash 255 may, for example, be used in low light conditions. In the example embodiment illustrated, the flash 255 is coupled with the main processor 240 of the electronic device 201. However, in other embodiments, the flash 255 may be coupled to the image signal processor (not shown) of the camera 253 which may be used to trigger the flash. The image signal processor may, in at least some embodiments, control the flash 255. In at least some such embodiments, applications associated with the main processor 240 may be permitted to trigger the flash 255 by providing an instruction to the image signal processor to instruct the image signal processor to trigger the flash 255.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220, such as applications 224, stored in memory such as persistent memory; for example, in the flash memory 244. As illustrated in FIG. 3, the software modules 220 may include operating system software 222 and one or more additional applications 224 or modules such as, for example, a camera application 297. The processor 240 may also operate to process data 227 stored in memory associated with the electronic device 201.

In the example embodiment of FIG. 3, the camera application 297 is illustrated as being implemented as a stand-alone application 224. However, in other example embodiments, the camera application 297 could be provided by another application or module such as, for example, the operating system software 222. Further, while the camera application 297 is illustrated with a single block, the functions or features provided by the camera application 297 could, in at least some embodiments, be divided up and implemented by a plurality of applications and/or modules.

The camera application 297 may, for example, be configured to provide a viewfinder on the display 204 by displaying, in real time or near real time, an image defined in the electronic signals received from the camera 253. The camera application 297 may also be configured to capture an image or video by storing an image or video defined by the electronic signals received from the camera 253. For example, the camera application 297 may be configured to store an image 298 or video to memory of the electronic device 201.

The camera application 297 may also be configured to control options or preferences associated with the camera 253. For example, the camera application 297 may be configured to control a camera lens aperture and/or a shutter speed. The control of such features may, in at least some embodiments, be automatically performed by the camera software based on output received from a light exposure meter.

In at least some embodiments, the camera application 297 may be configured to focus the camera 253 on a subject. For example, the camera application 297 may be configured to control an actuator of the camera 253 to move a lens (which is comprised of one or more lens elements) in the camera 253 relative to an image sensor in the camera 253. For example, when capturing images of subjects which are very close to the camera 253 (e.g. subject at macro position), the camera application 297 may control the actuator to cause the actuator to move the lens away from the image sensor.

In at least some embodiments, the camera application 297 may provide for auto-focusing capabilities. For example, the camera application 297 may analyze received electronic signals to determine whether the images captured by the camera are in focus. That is, the camera application 297 may determine whether the images defined by electronic signals received from the camera 253 are focused properly on the subject of such images. The camera application 297 may, for example, make this determination based on the sharpness of such images. If the camera application 297 determines that the images are not in focus, then the camera application 297 may cause the processor to adjust the actuator which controls the lens to focus the image.

In at least some embodiments, the camera application 297 may be configured to control the flash 255 associated with the camera 253 and/or to control a zoom associated with the camera 253. In at least some embodiments, the camera application 297 is configured to provide digital zoom features. The camera application 297 may provide digital zoom features by cropping an image down to a centered area with the same aspect ratio as the original. In at least some embodiments, the camera application 297 may interpolate within the cropped image to bring the cropped image back up to the pixel dimensions of the original. The camera application 297 may, in at least some embodiments, provide image stabilization for the camera. Image stabilization may reduce blurring associated with movement of the camera 253.

In at least some embodiments, the metadata 299 designating an image as either a primary image or a secondary image may be used when displaying images. For example, in at least some embodiments, the camera application 297 may provide a slideshow mode in which a slideshow of images may be displayed on a display of the electronic device. The slideshow may exclude images designated as secondary images until a command to toggle to a secondary image is received via an input interface 206 while an image designated as a primary image is displayed. In response to receiving such an input, the camera application 297 may cause the secondary image which is associated with the displayed primary image (i.e. the secondary image which was captured at approximately the same time as the displayed primary image) to be displayed. That is, in the slideshow mode, the electronic device 201 may only display primary images unless a specific instruction is received instructing the electronic device to display a secondary image.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Example Lens for a Camera

Light that emanates from the flash 255 can be used to illuminate a subject while the camera 253 captures the image of the subject. For example, light emanating from the flash 255 reflects off the subject and is received at the image sensor associated with the camera 253 in order to capture the illuminated subject. However, light emanating from the flash 255 can cause interference with the image sensor or with light received at the image sensor, which can negatively affect the quality of image or video captured by the camera 253. For example, light emanating from the flash 255 can appear as a reflection or glare on images or video captured by the camera 253. By way of further example, light emanating from the flash 255 can pass through the lens 280 and, rather than bouncing or reflecting off of a subject, the light may reflect off of the lens 280 and interfere with the light from the subject received at the image sensor. The severity of the effect of this interference (also called "crosstalk") is often directly related to the distance between the flash 255 and the image sensor on the electronic device 201 or associated with the camera 253. Such interference can be worse if there is a clear or transparent path in the lens 280 between the flash 255 and the image sensor through which light can travel. For example, light emanating from the flash 255 can reflect off of the lens 280 and interfere with the light otherwise received at the image sensor in the camera 253.

In accordance with an embodiment, a lens 280 for a camera that includes a barrier 402 can be used to mitigate or limit the interference from reflected light that may emanate from the flash 255 and be received at the image sensor.

Figure 4:
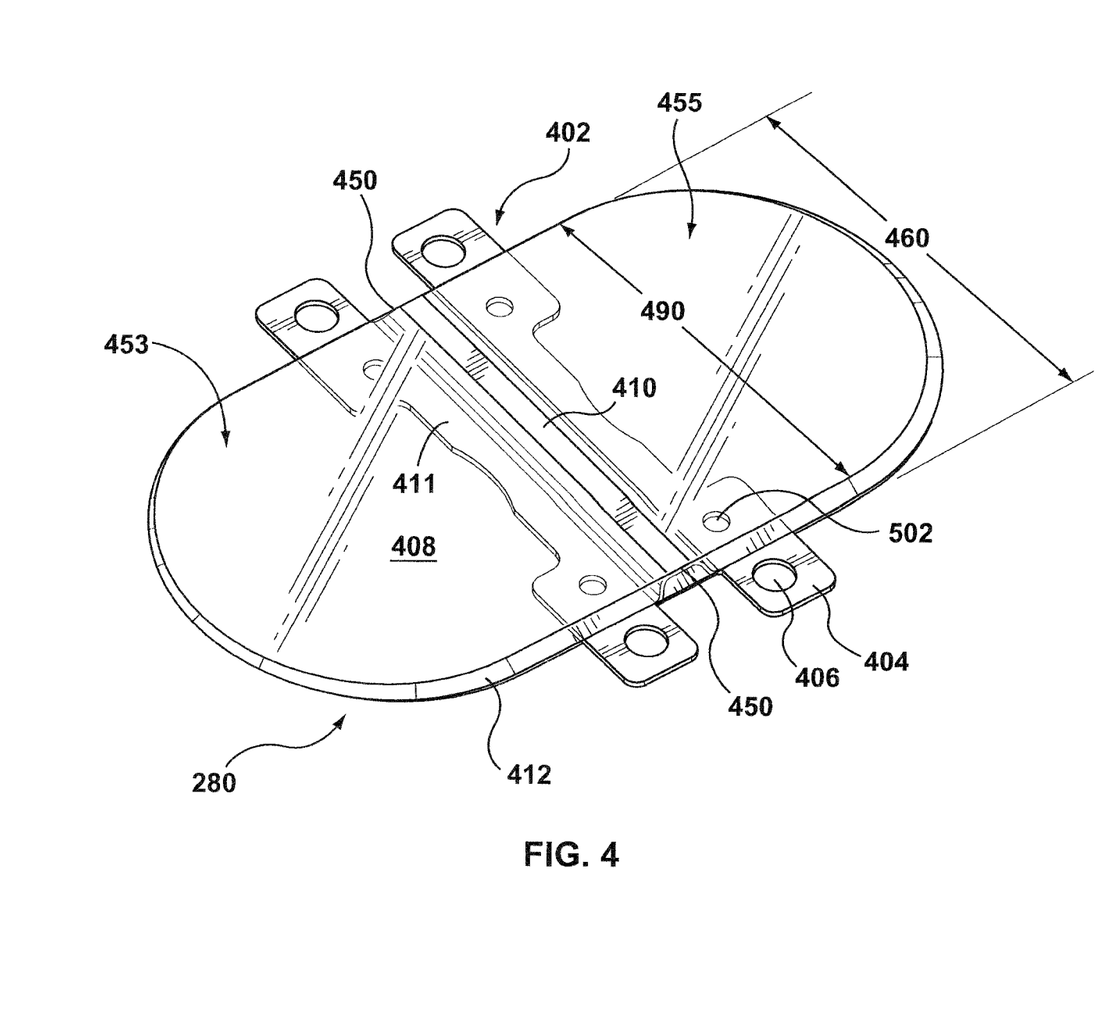
FIG. 4 is a perspective view of a lens with a metal barrier inside.

FIG. 4 illustrates an exemplary lens 280 including a barrier 402. The lens 280 includes a flash portion 455 and an image sensor portion 453. A barrier 402 is embedded in the lens 280. The barrier 402 can be in the lens between the flash portion 455 and the image sensor portion 453. When the lens 280 is secured to the camera 253 and flash 255, or when the lens 280 is supported by a housing along with a camera 253, as in FIGS. 1 and 2, the flash portion 455 covers the flash 255 and the image sensor portion 453 covers the image sensor associated with the camera 253. In one or more embodiments, the barrier 402 is integral with the lens 280. That is the barrier 402 may be integral with the flash portion 455 and the image sensor portion 453. The flash portion 455 and the image sensor portion 453 may be part of a single integral lens 280.

Figure 5:
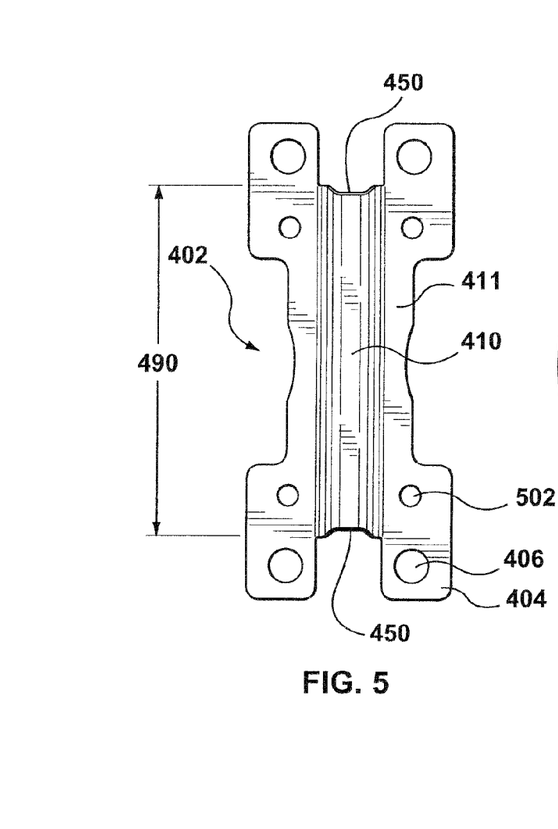
FIG. 5 is a top view of a metal barrier in isolation.
Figure 6:
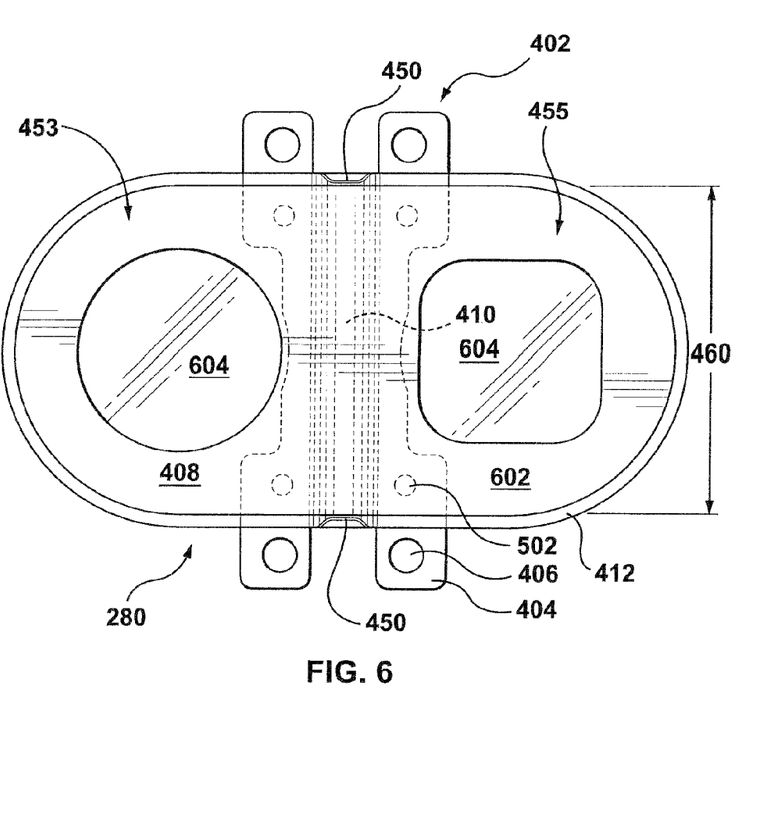
FIG. 6 is a perspective view of a lens with a metal barrier inside.
Figures 7A, 7B:
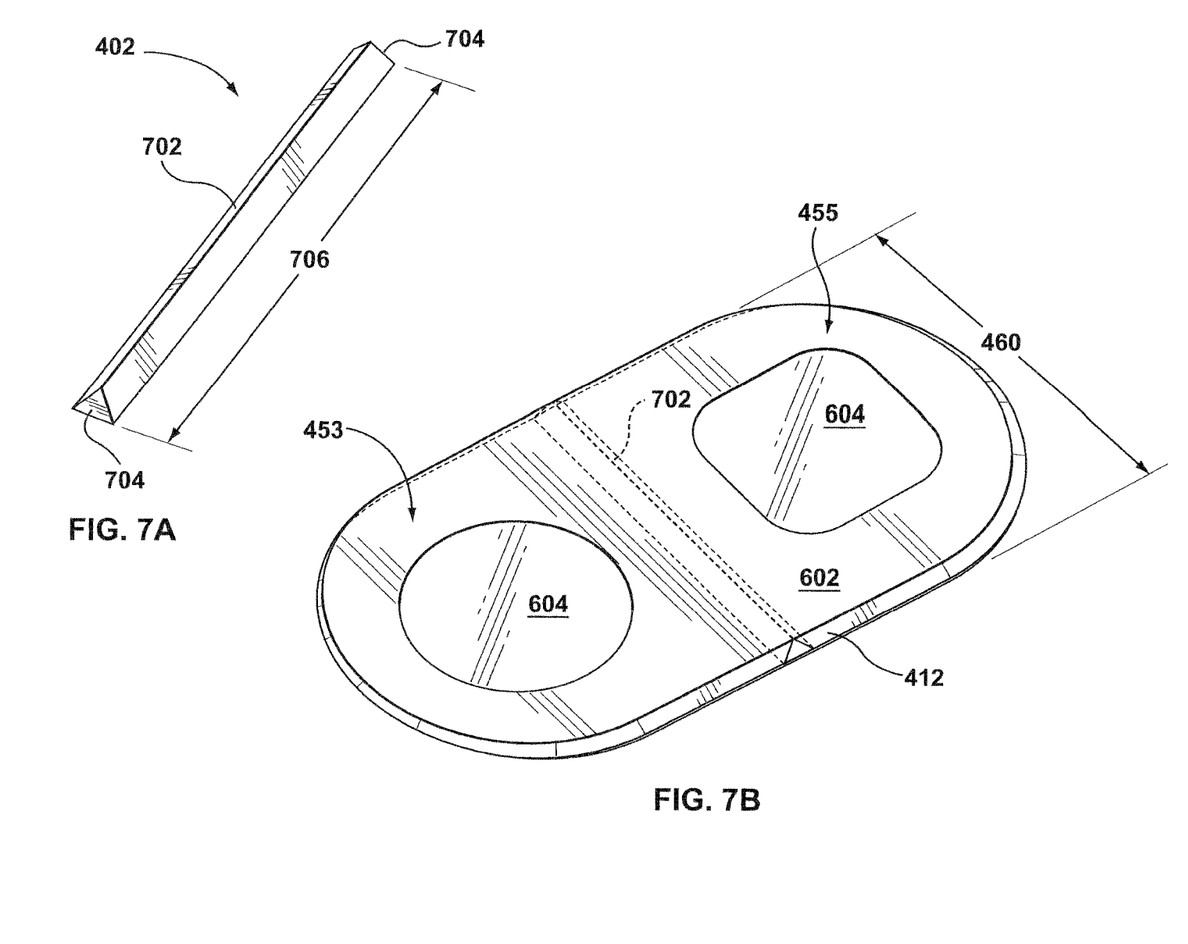
FIG. 7A is a perspective view of a plastic barrier in isolation.
FIG. 7B is a perspective view of a lens with a plastic barrier.

The barrier 402 can be translucent or opaque and can be made out of metal, as shown for example in FIGS. 4, 5 and 6, or plastic as shown for example in FIGS. 7A and 7B. The barrier 402 may be embedded into the lens 280 such that it extends from a top surface 408 of the lens 280 to a bottom surface of the lens 280. In one or more embodiments, the barrier 402 does not extend to one or more of the top surface 408 of the lens 280 and the bottom surface of the lens 280. For example, the barrier 402 may extend to the bottom surface of the lens 280 toward the top surface 408 but it may not reach the top surface 408. The barrier 402 may define a length 490 that corresponds to a width 460 defined by the lens 280. In one or more alternative embodiments, the barrier 402 defines a length 490 that is shorter than the width 460 defined by the lens 280. The length 490 of the barrier 402 may be defined as the distance between two ends 450 of the barrier 402. The barrier 402 may extend from a first side of the lens 280 to a second side of the lens 280, with the first side of the lens 280 parallel to the second side of the lens 280. Each end 450 of the barrier 402 extends to the edge 412 of the lens 280.

In accordance with the embodiment shown in FIG. 4, the barrier 402 has a top portion 410 that is integral with and connected to a lower portion 411. The top portion 410 is in the form of a planar surface parallel to the surface 408 of the lens and extends from two of its sides to the lower portion 411. The top portion 410 may be flush with the top surface 408 of the lens 280. In one or more embodiments, the top portion 410 may lie in the lens 280 underneath the top surface 408 of the lens 280. The ends 450 of the barrier 402 may correspond to the ends of the top portion 410 of the barrier 402. The lower portion 411 is parallel to the top surface 408 of the lens. Four flanges 404 extend from the lower portion 411 of the barrier 402 out of the lens 280. Each of the four flanges defines holes 406 which may be used to secure the lens 280 to a housing (such as the electronic device 201 shown in FIGS. 1 and 2). The barrier 402 may be in a different configuration and shape as that shown in the figures. For example, the top surface of the barrier 402 need not be planar, and the ends 450 of the barrier 402 may not extend to the edge 412 of the lens 280. The function or intended use of the barrier 402 can include blocking or inhibiting unwanted light (e.g. reflected inside the lens 280) from interfering with the image sensor.

In the embodiment illustrated in FIGS. 4 to 6, there are four securing holes 502 in the barrier 402, embedded inside of the lens 280, with each hole proximal to a flange 406. The securing holes 502 may be defined in the barrier 402 in order to secure the barrier 402 to the lens 280. For example, resin may be applied into the securing holes 502 in order to secure the barrier 402 to the lens 280. By way of further example, the lens 280 may be molded around the barrier 402 such that the lens 280 material (i.e. the material that molds into the lens 280) passes through each of or at least one of the securing holes 502. There may be other holes, or other securing holes, in the barrier 402 at other locations that can be used to secure the barrier 402 to the lens 280. Similarly, in one or more alternative embodiments, the securing holes 502 shown in FIG. 4 may be in different locations on the barrier 402, or there may be fewer or more than four securing holes 502.

The holes 406 defined by each of the four flanges 404 may be configured to receive a screw, nail, or one or more other attachment component. The attachment component(s) may be used to secure to lens 280 to the housing or to an electronic device 201, such as that shown in FIGS. 1 and 2.

FIG. 5 shows the barrier 402 in isolation. The lower portion 411 of the barrier 402 includes the four flanges 404 that each define a hole 406. Beside or proximal to each flange 404 on the lower portion 411 of the barrier 402 are the securing holes 502.

FIG. 6 is a top view of the lens 280 with the barrier 402. The top surface 408 of the lens 280 has a layer of foil 602 adhered to it. The foil can be made out of plastic or metal (e.g. aluminum) and can have a thickness in a range of approximately 3 to 5 microns (or micrometers), for example. In accordance with one or more embodiments, the foil is applied so as to leave open areas 604 on the top surface 408 of the lens 280 at each of the image sensor portions 453 and flash portions 455 of the lens 280. The foil can be applied using injection molding or another type of molding. Alternatively, the foil can be applied using an adhesive. The adhesive may be heat activated for example. In one or more embodiments, the foil can be paint or a liquid spray that is applied to a portion of the lens 280. The foil can be applied so as to not interfere with the light that passes from the flash 255 through the flash portion 455 and so as to not interfere with the light that passes through the image sensor portion 453 to the image sensor. In one or more embodiments, the foil 602 is applied to at least a portion of the barrier 402 instead of or in addition to the lens 280. The foil 602 may be made out of a different material from the barrier 402.

In one or more embodiments, the lens 280 does not include or use a foil 602.

The barrier 402 may be in a different configuration as that illustrated in the figures. For example, the barrier 402 may not be in the approximate center of the lens 280. By way of further example, the barrier 402 may not be perpendicular to the sides of the lens 280 and may instead be angled within the lens 280 (e.g. relative to the edge 412). In yet a further example, the barrier 402 may be closer to the image sensor portion 453 than it is to the flash portion 455, or vice versa.

Other forms of barriers 402 may be used in the lens 280. With reference to FIGS. 7A and 7B, in one or more embodiments the barrier 402 is a plastic barrier 702. The plastic barrier 702 (shown in isolation in FIG. 7A) is depicted having a triangular cross-section, although other cross sections may be implemented. The plastic barrier 702 may be made out of colored plastic or may have a colored (i.e. opaque) paint applied to it. The plastic barrier 702 defines a length 706 between two ends 704. When the plastic barrier 702 is contained or held inside of the lens 280 the two ends 704 extend from one edge of the lens 280 to another edge of the lens 280 such that the length 706 of the plastic barrier 702 corresponds to the width 460 of the lens 280. In other embodiments, the length of the plastic barrier 702 does not correspond to the width 460 of the lens 280. For example, the length 706 of the plastic barrier 702 may be shorter or longer than the width 490 of the lens 280. By way of further example, the length 706 of the plastic barrier 702 may be shorter than the width 460 of the lens 280 and the ends 704 of the plastic barrier 702 may both be inside of the lens 280. In the embodiment illustrated in FIG. 7B, the barrier 702 is positioned in the lens 280 such that an apex of the triangular cross-section of the barrier 702 is pointed towards (and may be flush with) the top surface 408 of the lens 280. In one or more alternative embodiments, the barrier 702 is positioned such that the apexes of the triangular cross-section defined by the barrier 702 are not pointing towards the top surface 408 of the lens 280.

FIG. 7B shows the lens 280 with the plastic barrier 702 and a foil 602 layer applied onto a portion of the top surface of the lens 280. The foil 602 does not cover open areas 604 which correspond to at least a portion of the flash portion 455 and image sensor portion 453 of the lens 280. In the illustrated embodiment, the foil 602 is only secured or adhered to the top surface of the lens 280. However, in other embodiments, the foil 602 may instead or may also be secured to the edges 412 or the bottom surface or both. In one or more embodiment, the barrier 402 in the lens 280 may be a plastic barrier 702 with no foil 602 attached to the barrier 402 or lens 280. Alternatively, the foil 602 may be attached to the plastic barrier 702.

In the embodiment shown in the figures, the flash portion 455 and the image sensor portion 453 are integral with the barrier 402. A space can exist between the flash 255 and the image sensor. When the lens 280 is in use (or supported by the housing) and the image sensor portion 453 is covering the image sensor and the flash portion 455 is covering the flash 255, the distance between the flash portion 453 and image sensor portion 453 can correspond to the space between the flash 255 and the image sensor. In such an embodiment, the distance between the center of the flash 255 and the center of the image sensor can be such that, when the lens 280 is in use, light that emanates from the flash 255 can pass through (or reflect within) the lens and cause interference with the camera 253 (or with the image sensor) if not otherwise prevented (e.g. by the barrier 402). For example light emanative from the flash 255 could travel in the lens 280 and (if not otherwise obstructed, by the barrier 402 for example) could interfere with the camera. In one or more embodiments, when the lens 280 is secured to or mounted on the housing, the approximate distance between the center of the flash 255 and the center of the image sensor could be up to 20 millimeters. In one or more embodiments, the flash 255 and image sensor can be abutting, such that there is no gap between the two.

The flash portion 455 of the lens 280 is for covering the flash 255 and is transparent to allow light from the flash 255 to pass through while blocking debris from entering into the flash 255. The image sensor portion 453 of the lens 280 is for covering the image sensor and is also transparent to allow light to pass through into the image sensor associated with the camera 253 while blocking debris from entering into the image sensor. For example, when the lens 280 is in operation, the image sensor portion 453 covers the image sensor and the flash portion 455 covers the flash 255. The top surface 408 of the portion of the lens 280 that does not comprise the flash portion 455 or the image sensor portion 453 can have foil 602 adhered to it (as in FIGS. 6 and 7B).

The lens 280 can be mounted on, supported by or contained inside of the housing of the electronic device 201. When the lens 280 is mounted on or contained inside of the housing, the image sensor portion 453 of the lens 280 is configured to cover the image sensor. Similarly, when the lens 280 is mounted on or contained inside of the housing, the flash portion 455 of the lens 280 is configured to cover the flash 255. For example, when the lens 280 is mounted on or contained inside the housing, the lens 280 is positioned such that the flash portion 455 covers the flash 255 and the image sensor portion 453 covers the image sensor (as shown in FIG. 5, described below). The flash portion 455 and the image sensor portion 453 on the lens 280 are configured to align with the flash 255 and image sensor, respectively, when the lens 280 is in use or when it is secured to the housing. By way of further example, the housing can define a first opening and a second opening and lens 280 may be configured such that the flash portion 455 is aligned with the first opening for allowing light to pass therethrough and the image sensor portion 453 may be aligned with the second opening to allow light to pass therethrough.

The lens 280 can be connected to the housing such that the lens 280 extends from one side of the housing to the other. Or, in an alternative embodiment, the lens 280 covers the flash 255 and image sensor but does not extend to either side of the housing. In a further embodiment, the lens 280 covers a majority of the rear face 108 (or front face 106, as the case may be) of the electronic device 201. The lens 280 can be mounted to the housing such that the outer surface of the lens 280 is flush with the outer surface of the housing (i.e. the rear face 108 in the case of a rear facing camera 253). In a further embodiment, the lens 280 is not supported by the housing. For example, the lens 280 is supported by the camera 253 and/or the flash 255 or another component of the electronic device 201.

In one or more embodiments, there are additional lens elements underneath the lens 280 that may be between the image sensor and image sensor portion 453. For example, the additional lens elements may be associated with or attached to the camera and controlled by an actuator, as described above.

In an alternative embodiment, the lens 280 is contained within the housing such that a first opening in the housing aligns with the image sensor portion 453 of the lens 280 and a second opening in the housing aligns with the flash portion 455 of the lens 280. Similarly, the image sensor and the flash 255 can also be aligned with the first and second openings in the housing, respectively, so that light can pass through the first and second openings in the housing and through the flash portion 455 and image sensor portion 453 of the lens 280. In such an embodiment, the portions of the lens 280 that do not include the flash portion 455 and the image sensor portion 453 may be contained within the housing. For example, foil 602 may be adhered to a portion of the lens 280, and the foil 602 may be contained within the housing. In further embodiments, there is an adhesive seal on the lens for securing the lens 280 to the interior of the housing.

The shape of the image sensor portion 453 can be different than that of the remainder of the lens 280 to accommodate the lens requirements for the image sensor. Similarly, the shape of the flash portion 455 can also be different from the shape of the remainder of the lens 280 in order to accommodate the needs of the flash 255. For example, in an embodiment, the image sensor portion 453 and/or the flash portion 455 are concave and the remainder of the lens 280 is generally planar. Similarly, the arc of the curve of the flash portion 455 can be different from the arc of the curve of the image sensor portion 453, which can also be different from the arc of the curve of the lens 280.

When the lens 280 is secured to a housing or otherwise associated with a camera 253 in operation, the top surface 408 is distal to the flash 255 and image sensor; the bottom surface (not shown in the figures) of the lens 280, which is parallel to the top surface 408 but facing the opposite direction, is proximal to the flash 255 and image sensor when the lens 280 is in use with a camera 253. Accordingly, the top surface 408 of the lens 280 is the outer surface when the lens 280 is secured or supported by a housing. For example, the top surface 408 of the lens 280 may be flush with the outer surface of the housing.

The distance between an approximate center of the image sensor portion 453 and an approximate center of the flash portion 455 is intended to be similar to the distance, generally, between the center of the flash 255 and the center of the image sensor. The distance between the center of the flash portion 455 and the center of the image sensor portion 453 of the lens 280 may be approximately in the range of 7 to 20 millimeters. In some embodiments when the distance between the center of the image sensor and the center of the flash 255 is greater than 15 millimeters, the light emanating from the flash 255 does not interfere with the image sensor.

In accordance with one or more embodiments, light that emanates from the flash 255 can be controlled by the placement and the shape or both of the barrier 402 relative to the lens 280. For example, light that emanates from the flash 255 can be inhibited from passing through or reflecting within the lens 280 and interfering with the image sensor by the barrier 402. By way of further example, unwanted light that would otherwise reflect through the lens 280 (i.e. from the flash 255 to the image sensor) can be inhibited or blocked by the barrier 402 in the lens 280.

In one or more embodiments, paint can be applied to a portion of a surface of the lens 280 to assist with controlling or dispersing light that emanates from the flash 255. For example, dark or opaque paint can be applied on a portion of the surface 408 that does not impede the passage of light from the flash 255 through the lens 280 to the exterior of the camera 253 or from the exterior of the camera 253 through the lens 280 to the image sensor. For example, dark or opaque paint can be applied to the surface of the lens 208 in a location around the barrier 402. The paint can be applied before or after the lens 280 is secured to the housing. The paint can be applied to the portion of a surface of the lens 280 (e.g. top surface 408) or the barrier 402 or both instead of foil 602 or in addition to foil 602.

In an embodiment, the lens has a thickness of between 1 millimeter and 1.5 millimeters. Variations on the dimensions, thickness and configuration of the lens 280 may be used.

Method for Making a Lens

Figure 8:
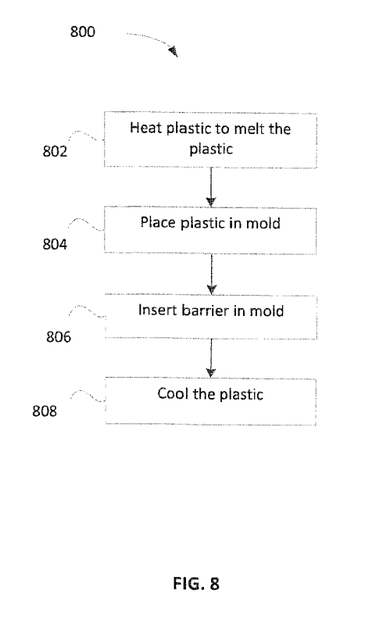
FIG. 8 is a flowchart showing a method of making a camera lens with a barrier.

FIG. 8 is a flowchart depicting a method 800 of making a lens 280 for a camera 253. The lens 280 made by the process can be the lens 280 described with reference to FIGS. 1 to 7B, for example. The method 800 may be performed in a factory using a machine suitable for molding, such as an injection molding machine. The barrier 402 may be made separately.

At 802, heat is applied to the plastic to melt the plastic. The plastic can be heated to at least to its melting point. The plastic can be in the form of plastic pellets or segments suitable for injection molding, for example. The plastic can be melted in a container or vat that may be specially designed for holding, melting and pouring (or injecting) plastic. The plastic can be poly(methyl methacrylate) (PMMA), polycarbonates (PC), or a combination of polycarbonate and Acrylonitrile butadiene styrene (PC/ABS), for example, or of another suitable plastic.

At 804 the plastic is placed in a mold. The mold can be for shaping the plastic into a lens 280 having a flash portion 455 for covering a flash 255 of a camera 253 and an image sensor portion 453 for covering an image sensor of the camera 253. The mold may be made out of metal and formed in the inverse of the shape of the lens 280. That is the mold is such that the plastic, when cooled, taking the shape of the mold will be in the form of a lens 280. The mold may be suitable for injection molding, for example.

In one or more embodiments, the plastic is placed in the mold before the plastic is heated. For example, solid plastic pellets or segments can be placed in the mold before being heated. Thus, the plastic is heated when it is in the mold. In such embodiments, the mold is made of material that has a higher melting temperature than plastic. In other words, the mold will not melt when it is heated to the melting temperature of the plastic.

At 806 a barrier 402 is inserted into the mold such that the barrier 402 is positioned between the flash portion 455 and the image sensor portion 453 of what will be the lens 280. The barrier 402 can be one of the barriers 402 described above, for example. If the barrier 402 is a plastic barrier 702, then the melting point of the plastic barrier 702 is higher than that of the lens 280 so that there is a temperature range in which the lens 280 will melt to a liquid state while the barrier 702 will remain in a solid state.

At 808 the plastic is cooled. For example, the plastic is cooled in the mold so that when the plastic hardens it is in the shape of the lens 280 defined by the mold. After the plastic is cooled it may be removed from the mold. In one or more embodiments, the mold may be reusable (i.e. to create another lens 280).

In one or more embodiments, the method 800 may be electronically operated. For example, the temperature of the plastic may be controlled by an electronic processor operating on instructions stored on a memory associated with the electronic processor.

In one or more embodiments, the barrier 402 may be inserted into the mold before placing the plastic in the mold (whether the plastic is melted or not). For example, the plastic may be melted in a container (at 802) after the barrier 402 has been inserted into the mold. The plastic may then be poured or injected into the mold and around the barrier 402. If the barrier 402 is a metal barrier as described in relation to FIGS. 4 to 6, then the melted plastic may be poured or injected around the barrier 402 so that it passes through the securing holes 502. In such an embodiment, when the plastic cools in the mold then the barrier 402 will be secured in the plastic at least partly due to the plastic cooling within the securing holes 502 and the plastic together with the barrier 402 will form the lens 280.

In one or more embodiments, the barrier 402 is made out of metal, such as the barriers 402 shown in FIGS. 4 to 6. For example, a temperature of at least 250 degrees Fahrenheit can be applied to the barrier 402 or the foil 602 or both to adhere the foil 602 to the barrier 402 to prevent scratching on the lens 280. The temperature applied to the barrier 402 or to the foil 602 or to both can be such that the barrier does not enter into the liquid state. For example, the foil 602 may include adhesive that is activated by heat. The foil 602 can be adhered to the barrier 402 before the barrier 402 is placed in the plastic or mold. For example, the foil 602 can be secured or adhered to the barrier 402 by overlaying a thin metal foil onto a surface 408 of the barrier 402. The foil 602 may be adhered onto a surface of the barrier using an injection molding machine, for example. By way of further example, the foil may be metallic or plastic.

In one or more embodiments, an additional layer of transparent material may be adhered to the top surface 408 of the lens 280. For example, after the lens is manufactured according to the method 800, an additional layer of transparent plastic can be injection molded or otherwise adhered to the top surface 408 of the lens 280. Alternatively, the additional layer can be sprayed or brushed onto the top surface 408 of the lens 280. For example, the additional layer can be in a liquid state that can be sprayed or rushed onto the lens 280, after which the additional layer can dry and harden. The additional layer can have certain properties such as repelling fingerprint marks.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is the following:

1. A lens for a camera, the lens having a planar top surface and a parallel bottom surface and the camera having a flash and an image sensor, the lens comprising:
    a transparent portion extending between the top and bottom surfaces of the lens, the transparent portion including:
        a flash portion for covering the flash;
        an image sensor portion for covering the image sensor; and
    a barrier embedded inside the transparent portion and positioned between the image sensor portion and the flash portion, the barrier being a separate component from the image sensor portion and the flash portion, wherein the barrier having a top portion and a lower portion, the lower portion being in the form of a planar surface that is substantially parallel to the top surface of the lens, wherein the lower portion defines a plurality of securing holes positioned inside the transparent portion such that lens material of the transparent portion passes through at least some of the securing holes to secure the barrier to the transparent portion;
    wherein the barrier is integral with the image sensor portion and the flash portion of the lens and wherein the lens is made out of molded plastic and the barrier is molded into the lens by inserting the barrier into a mold and inserting melted plastic associated with the lens into the mold.

2. The lens of claim 1, wherein the barrier is made out of one of metal and plastic.

3. The lens of claim 1, wherein the barrier is made out of plastic and the barrier has a triangular cross-section.

4. The lens of claim 1, wherein a length defined by the barrier corresponds to a width defined by the lens.

5. The lens of claim 1, wherein the distance between a center of the image sensor portion and a center of the flash portion is less than 20 millimeters.

6. The lens of claim 1, wherein the barrier extends from the top surface of the lens to the bottom surface of the lens.

7. The lens of claim 1, wherein the lower portion of the barrier includes a plurality of flanges which extend out of the lens, at least one of the plurality of flanges defining holes for securing the lens to the camera.

8. The lens of claim 7, wherein at least one of the securing holes is proximal to at least one of the plurality of flanges.

9. An electronic device comprising:
    an image sensor;
    a flash adjacent to the image sensor;
    a lens having a planar top surface, a parallel bottom surface, and a transparent portion extending between the top and bottom surfaces of the lens, the transparent portion including an image sensor portion for covering the image sensor and a flash portion for covering the flash;
    a barrier embedded inside the transparent portion of the lens and positioned between the image sensor portion and the flash portion for inhibiting the passage of light from the flash portion to the image sensor portion, the barrier being a separate component from the image sensor portion and the flash portion, wherein the barrier having a top portion and a lower portion, the lower portion being in the form of a planar surface that is substantially parallel to the top surface of the lens, wherein the lower portion defines a plurality of securing holes positioned inside the transparent portion such that lens material of the transparent portion passes through at least some of the securing holes to secure the barrier to the transparent portion, and
    a housing for housing the image sensor and the flash,
    wherein the barrier is integral with the image sensor portion and the flash portion of the lens and wherein the lens is made out of molded plastic and the barrier is molded into the lens by inserting the barrier into a mold and inserting melted plastic associated with the lens into the mold.

10. The electronic device of claim 9, wherein the housing defines a first opening and a second opening, and wherein the lens is configured such that the flash portion is aligned with the first opening for allowing light to pass therethrough and the image sensor portion is aligned with the second opening for allowing light to pass therethrough.

11. The electronic device of claim 9, wherein the barrier is metal.

12. The electronic device of claim 11, further comprising foil adhered to the barrier for inhibiting scratching of the lens.

13. The electronic device of claim 9, further comprising foil adhered to a portion of the lens.

14. The electronic device of claim 9, wherein the barrier extends from a top surface of the transparent portion to a bottom surface of the transparent portion.

15. The electronic device of claim 14, wherein the top surface of the transparent portion of the lens is distal to the flash and the image sensor and the bottom surface of the transparent portion of the lens is proximal to the flash and the image sensor when the lens is secured to the housing.

* * * * *